US008407783B2

(12) United States Patent
Huang et al.

(10) Patent No.: US 8,407,783 B2
(45) Date of Patent: Mar. 26, 2013

(54) COMPUTING SYSTEM PROVIDING NORMAL SECURITY AND HIGH SECURITY SERVICES

(75) Inventors: Jing-Kuang Huang, Hsinchu (TW); Chih-Pin Su, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 358 days.

(21) Appl. No.: 12/817,387

(22) Filed: Jun. 17, 2010

(65) Prior Publication Data

US 2011/0314538 A1 Dec. 22, 2011

(51) Int. Cl.
*G06F 21/00* (2006.01)
(52) U.S. Cl. ............................. 726/19; 713/192; 726/28
(58) Field of Classification Search .................... 726/19, 726/28; 713/192
See application file for complete search history.

(56) References Cited

U.S. PATENT DOCUMENTS

| | | | |
|---|---|---|---|
| 2006/0265734 A1* | 11/2006 | Chen et al. ................... | 726/2 |
| 2008/0052534 A1* | 2/2008 | Harada et al. ................ | 713/190 |
| 2008/0092145 A1 | 4/2008 | Sun et al. | |
| 2009/0293132 A1* | 11/2009 | Henry et al. .................. | 726/27 |

OTHER PUBLICATIONS

Suh et al. "AEGIS: Architecture for Tamper-Evident and Tamper-Resistant Processing", 2004, Computation Structures Group Memo 474 CSAIL Massachusetts Institute of Technology.*

* cited by examiner

*Primary Examiner* — Kambiz Zand
*Assistant Examiner* — Michael Guirguis
(74) *Attorney, Agent, or Firm* — McClure, Qualey & Rodack, LLP

(57) ABSTRACT

A computing system and method providing normal security services and high security services are disclosed. The computing system includes hardware resources, a processor core and an access right checker. The hardware resources are grouped into resource security levels. The processor, switching between a normal security and a high security state, assigns a user access right to a request. In comparison with the normal security state, user access right assigned in the high security state further allows the request to use the hardware resources of a higher resource security level. According to the assigned user access right and the resource security levels of required hardware resources of the request, the access right checker determines whether the request has the authority to use the hardware resources, and thereby, the access right checker executes the request or responds the issued request with an exception.

17 Claims, 5 Drawing Sheets

COMPUTING SYSTEM PROVIDING NORMAL SECURITY AND HIGH SECURITY SERVICES

BACKGROUND OF THE INVENTION

1. Field of the Invention

The present invention relates to computing systems providing normal security services and high security services with efficient resource utilization.

2. Description of the Related Art

In many consumer electronics such as mobile phones, PDAs, digital cameras, digital media and music players, handheld game consoles, and computer peripherals (such as hard drives and routers), two isolated operating environments are required for maintaining system security.

Normal security services, such as making a phone call and playing java games may operate in a normal security environment. However, when high security services such as online credit card payments are requested, the normal security environment may not satisfy security requirements of e-banking services. Instead, a high security environment isolated from the normal security environment is required to handle such high security services in order to prevent information theft.

Trustzone hardware architecture, developed by ARM, provides normal security services and high security services using a single physical processor core. Because only one processor core is required in the Trustzone hardware architecture, silicon size, manufacturing costs, and power consumption of the Trustzone hardware are considerably lower when compared with solutions using two dedicated processor cores. To isolate sensitive data from the malicious software disguised in a normal security environment, the single processor core of the Trustzone technique switches between a normal security state and a high security state to provide a normal security environment and a high security environment in a time-sliced fashion, and the hardware resources are design dedicated to the normal security environment or the high security environment.

However, the design of dedicated hardware resources results in low resource utilization. Resources such as file system, memory, registers, and engine dedicated to the high security environment are seldom used as the probability of switching to the high security state is typically low. To increase the utilization of these dedicated resources, the processor may frequently switch between the two security states. For example, services involve sensitive data or require dedicated hardware resources in a high security environment will be performed in the high security environment. Frequent switching of security states occurs. Latency and power consumption caused by switching of security environments are considerable.

Thus, a way to simultaneously reduce switching of security environments and increase utilization of hardware resources is called for.

BRIEF SUMMARY OF THE INVENTION

A computing system and method providing normal security services and high security services are provided.

An exemplary embodiment of the computing system comprises hardware resources, a processor core and an access right checker. The hardware resources are grouped into a plurality of resource security levels. The processor, switching between a normal security state and a high security state, assigns a user access right to a request. In comparison with the normal security state, user access right assigned in the high security state further allows the request to use the hardware resources of a higher resource security level. According to the assigned user access right and the resource security levels of required hardware resources of the request, the access right checker determines whether the request has the authority to use the hardware resources. When determining that the request has the authority to use the hardware resources, the access right checker allows the request to be executed. When determining that the request does not have the authority to use the hardware resources, the access right checker responds the request with an exception.

An exemplary embodiment of the disclosed method comprises the following steps. The method first provides hardware resources which are grouped into a plurality of resource security levels. Then, a user access right is assigned to a request. The processor core is switched between a normal security state and a high security state and, in comparison with the normal security state, user access right assigned in the high security state further allows the issued request to use the hardware resources of a higher resource security level. A determination is made based on the assigned user access right and the resource security levels of required hardware resources of the issued request, as to whether the request has the authority to use the hardware resources. When the request is determined to have the authority to use the hardware resources, the request is executed. When the request is determined to not have the authority to use the hardware resources, the request is responds with an exception.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
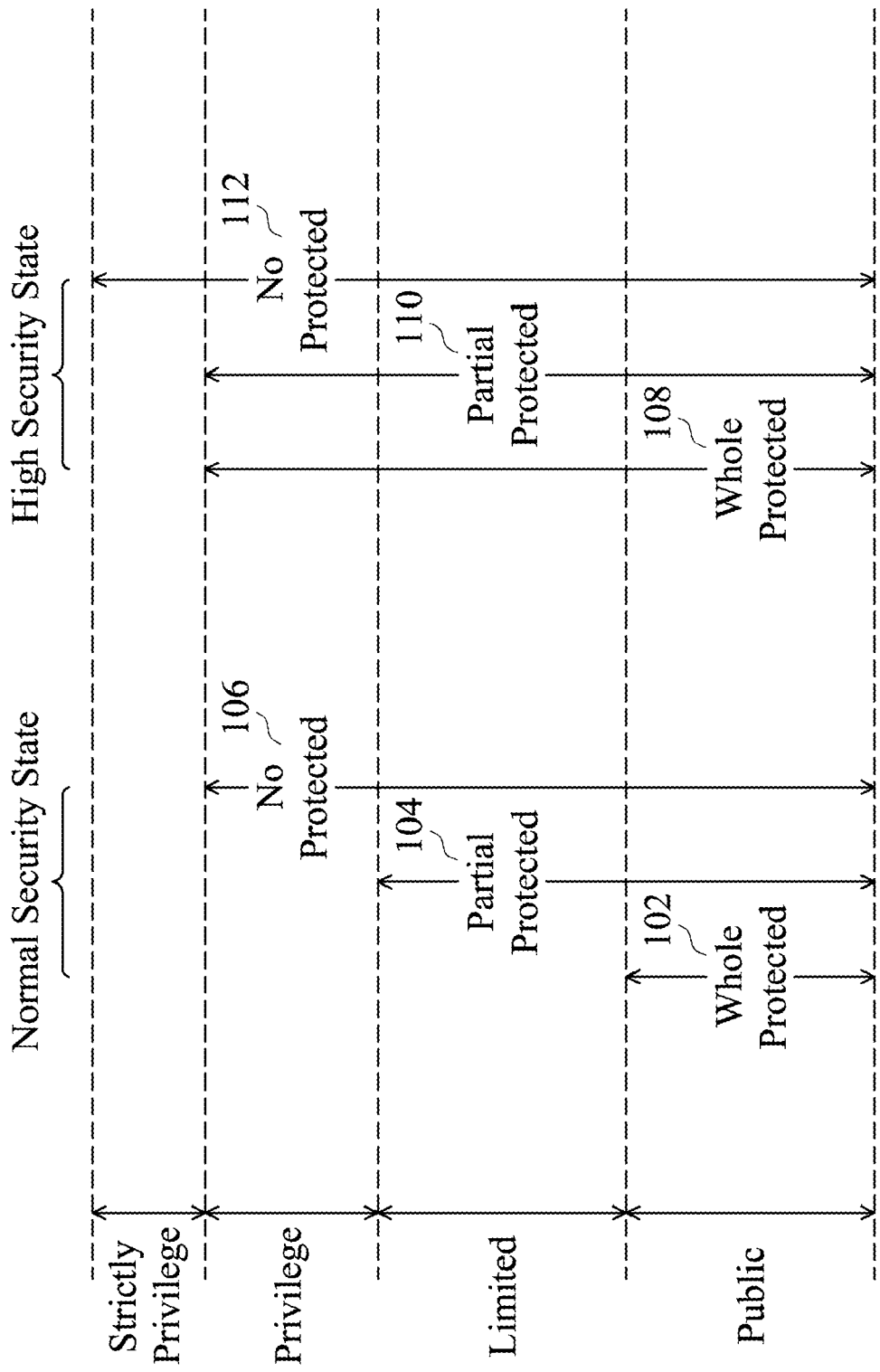
FIG. 1 illustrates an example depicting a concept of hardware resources sharing.

FIG. 1 illustrates an example depicting a concept of hardware resources sharing.

First, a definition of "Resource Security Level" (abbreviated to RSL) is introduced. In the computing system disclosed in the invention, the hardware resources, including the memory, registers, and hardware datapaths and so on, are divided into a plurality of groups according to resource security levels thereof. As shown in FIG. 1, four resource security levels—"Strictly Privilege", "Privilege", "Limited" and "Public" (from highest security level to lowest security level)

are used to classify the hardware resources. Each group contains hardware resources of a corresponding security level.

FIG. 1 further introduces a concept of "User Access Right" (abbreviated to UAR). When a processor core, switching between normal and high security states to build normal and high security environments, of the disclosed computing system issues a request, user access right is assigned to the request to show the available hardware resources of the request. The scope of the assigned user access rights is dependent on the security state of the processor core, or may further depend on a protection level of the computing system. Referring to FIG. 1, scopes 102, 104 . . . 112 show several user access right options when the processor core is switching between the normal security state and the high security state and the protection level is switching between the "Whole Protected", "Partial Protected" and "No Protected" levels.

For example, when the computing system is in the "Whole Protected" level and the processor core is in the normal security state, user access right assigned to each request issued from software codes covers the scope 102. Thus, only the hardware resources with the "Public" resource security level are available to the issued request. If the processor core is switched to the high security state and the protection level of the computing system is not changed (maintained at the "Whole Protected" level), user access right assigned to the issued request covers the scope 108 rather than the scope 102, to allow the issued request to further gain access to the hardware resources of a higher resource security level (scope 108 includes any available hardware resources belonged to the "Public" resource security level as well as the "Limited" and "Privilege" resource security levels).

Comparing the scopes 102 and 108 defining the user access right, the hardware resources of the "Public" resource security level are shared between the normal security environment and the high security environment while the hardware resources of "Limited" and "Privilege" resource security levels are limited to the high security environment. Thus, sensitive data, contained in the "Limited" and "Privilege" hardware resources, are protected from malicious software of the normal security environment, and the "Public" hardware resources containing no sensitive data are efficiently shared by the normal and high security environments. The disclosed hardware resource sharing embodiments increase utilization of hardware resources.

The concept introduced in FIG. 1 also considerably reduces the redundant switching of security environments. For example, when required hardware resources of a request all belong to the "Public" resource security level, no matter what security state the processor core is in, no switching of security environments is required because the required hardware resources are available in both the normal security and high security environments. Thus, the frequency for switching of security environments can be reduced, and time latency and power consumption caused by frequent switching of security environments are eliminated.

This paragraph discusses the protection level introduced in FIG. 1. A manufacturer may use a multi-purpose product to produce services of different security levels (for example, using the same hardware architecture to produce gaming, mobile phone call, or e-commerce services of different security levels). The introduced protection level is configured according to the security level requirement of the product, and it also affects the scope of user access right. In FIG. 1, there are three options for the protection level setting, from the highest security level to the lowest security level, they are "Whole Protected", "Partial Protected" and "No Protected" levels. The greater the protection level is, the less the hardware resources can be accessed. For example, when the processor core is in the normal security state, the UAR scope 106 for the "No Protected" level is greater than UAR scope 104 for the "Partial Protected" level, and the UAR scope 104 for the "Partial Protected" level is greater than the UAR scope 102 of the "Whole Protected" level. Note that different protection levels may have the same scopes of UAR in some specific cases. As shown in FIG. 1, when the processor core is in the high security state, the UAR scope 112 for the "No Protected" level is greater than the UAR scope 110 for the "Partial Protected" level while the UAR scope 110 for the "Partial Protected" level equals to the UAR scope 108 of the "Whole Protected" level.

Note that classification of the resource security levels and the protection levels and determination of the UAR scopes shown in FIG. 1 are not intended to limit the scope of the invention. The amount of the resource security levels and protection levels and the options for UAR may be different from those shown in FIG. 1.

Figure 2:
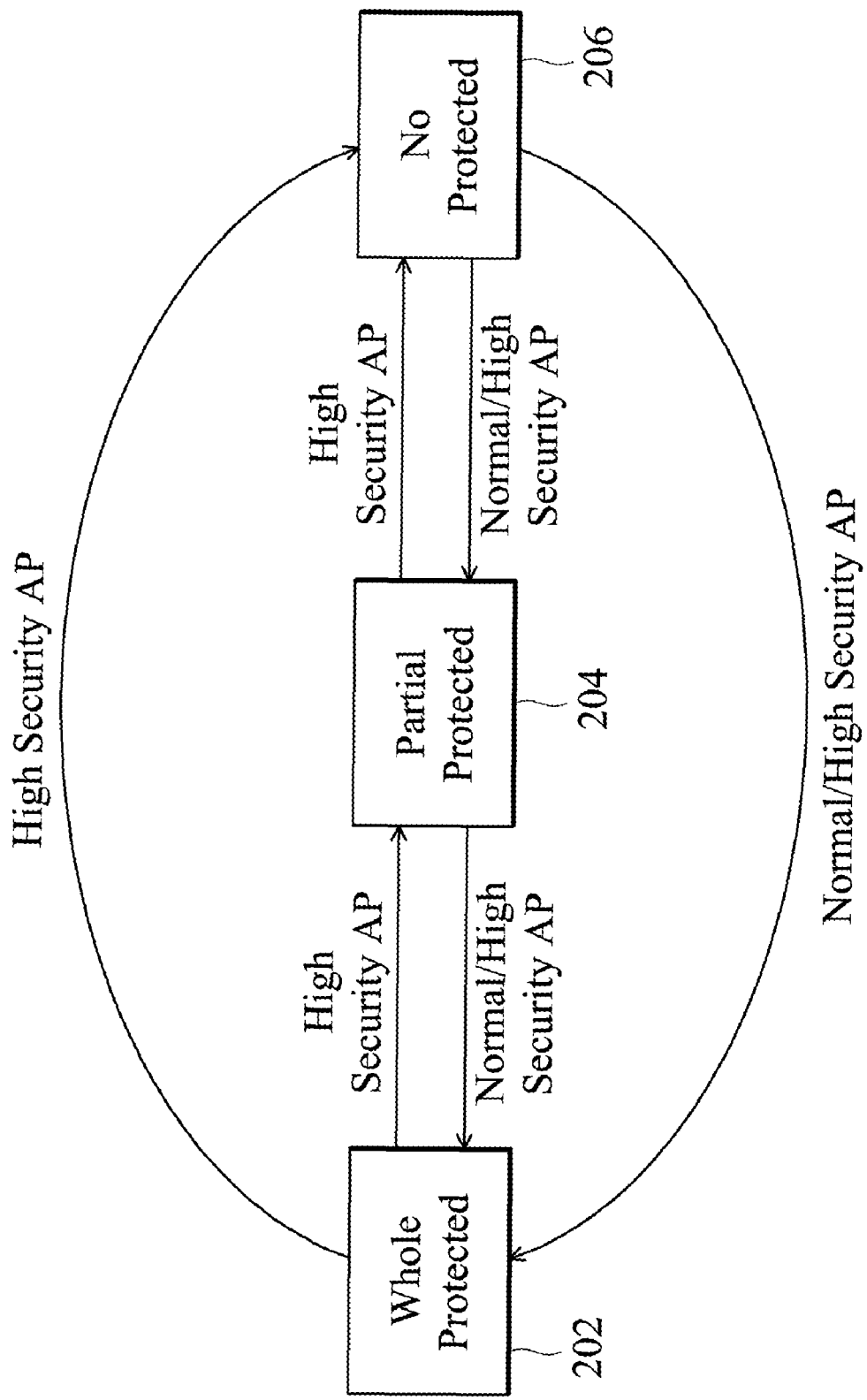
FIG. 2 illustrates a state machine showing a change rule of the protection level.

In an embodiment, the protection level of a computing system is extremely sensitive and should be stored in a register (named protection level register) of the "Strictly Privilege" resource security level. To avoid falsification, the setting of the protection level register may be limited during a security booting procedure of the computing system while the processor core is in the high security state. In other embodiments, the value stored in the protection level register may be changed in the run-time. FIG. 2 shows a change rule of the protection level. The disclosed protection level register is allowed to be changed from a higher security level to a lower security level only when the processor core is in the high security state, but is allowed to be changed from a lower security level to a higher security no matter what security state the processor core is in. Referring to FIG. 2, to downgrade the protection level from the "Whole Protected" level 202 to the "Partial Protected" 204 or to the "No Protected" level 206, or from the "Partial Protected" level 204 to the "No Protected" level 206, the processor core has to be in the high security state to execute corresponding high security applications (APs). Oppositely, to upgrade the protection level, from the "No Protected" level 206 to the "Partial Protected" level 204 or to the "Whole Protected" level 202, or from the "Partial Protected" level 204 to the "Whole Protected" level 202, the processor core is not limited to be in the normal or high security environment. The protection level upgrade can be achieved by either normal security APs or high security APs.

Note that when the protection level is changed, the initially isolated hardware resources may be released to be available to the issued request so that the sensitive data contained in the released hardware resources may be exposed. Thus, context management techniques are disclosed, which store and restore context of released or isolated hardware resources when the protection level stored in the protection level register is changed. The released hardware resources were initially forbidden from the issued request before the protection level was switched to a lower security level, and the isolated hardware resources were initially available to the issued request before the protection level was switched to a higher security level. Note that in some embodiments, the protection level of a product is configured at manufactory and cannot be changed in boot time or run-time.

Figure 3:
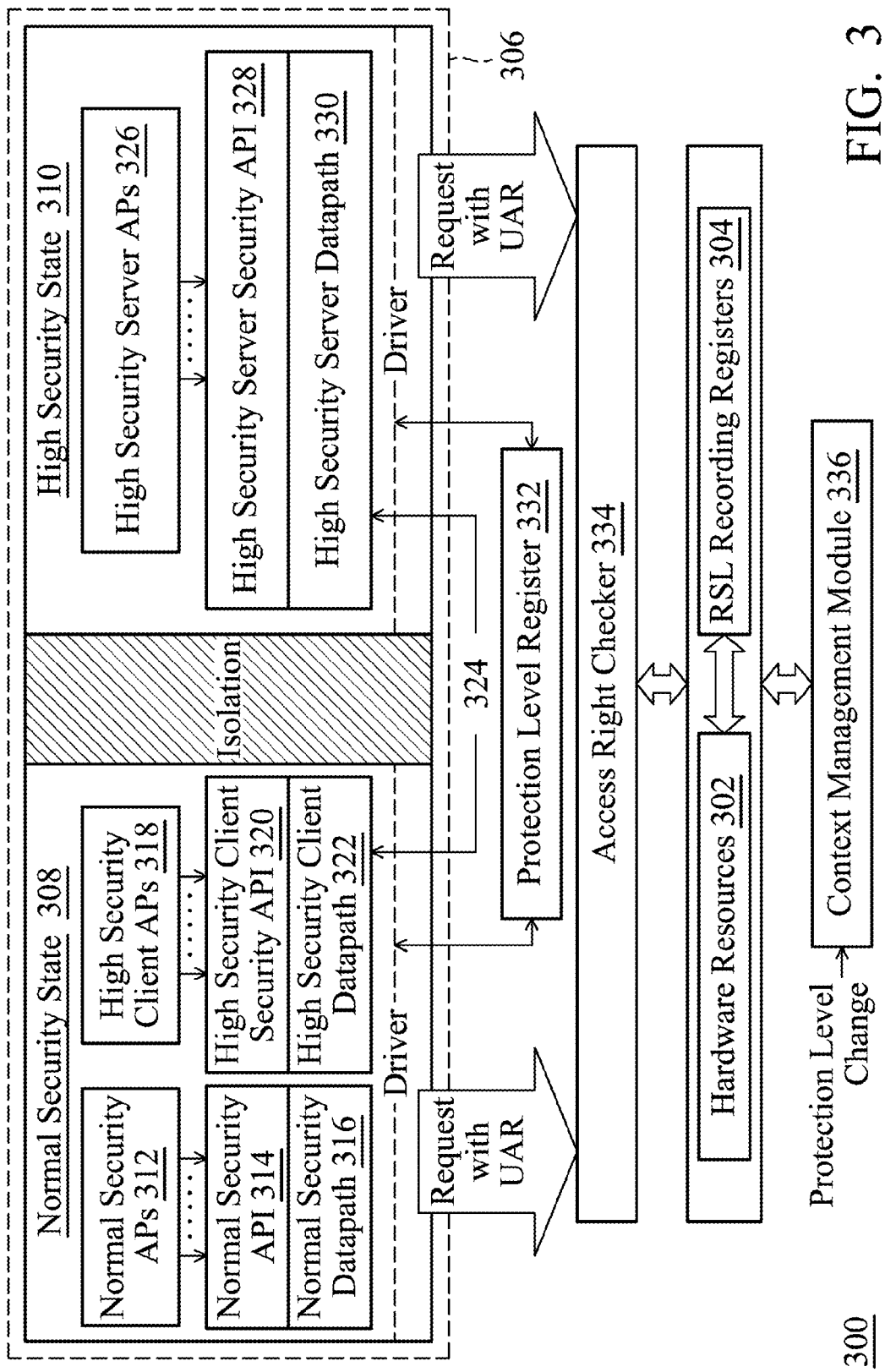
FIG. 3 depicts an architecture of the disclosed computing system.

FIG. 3 depicts the architecture of the disclosed computing system. As shown, the hardware resources 302 of the computing system 300 are equipped with resource security level (RSL) recording registers 304. The RSLs (for example, the "Strictly Privilege", "Privilege", "Limited" and "Public" levels defined in FIG. 1) of the hardware resources 302 are recorded in the RSL recording registers 304.

In the computing system 300, one single physical processor core 306 is provided, to switch between a normal security state 308 and a high security state 310 to form two isolated environments for normal security services and high security services, respectively. Normal security applications (APs) 312, normal security application programming interface (API) 314 and firmware of normal security datapath 316 are used to provide normal security services when the processor core 306 is in the normal security state 308. In addition, high security client APs 318, high security client API 320 and firmware of high security client datapath 322, performed when the processor core 306 is in the normal security state 308, operate as a security environment switching interface. The instructions 324 are provided for switching the security state of the processor core 306. The high security applications (APs) 326, high security application programming interface (API) 328 and firmware of high security datapath 330 are provided for high security services and are performed when the processor core 306 is in the high security state 310. The aforementioned software and firmware design allows the single processor core 306 to switch between the normal security state 308 and the high security state 310 in a time-sliced fashion.

Furthermore, in the firmware design of the processor core 306, no matter what security state the processor core 306 is in, each of the issued requests is assigned a scope of user access right (UAR). The assigned UAR may be dependent on the current security state of the processor core 302, or, in some embodiments, the protection level of the computing system (stored in the protection level register 332) may be further taken into consideration in determining the scope of the UAR. The determination of the UAR is disclosed in FIG. 1.

The UAR assigned to the issued request indicates available components of the hardware resources 302. The access right checker 334 receives the issued request and the assigned UAR, determines the required hardware resources of the issued request, and determines whether the received request has the authority to use the hardware resources 302 in accordance with the assigned UAR and the required hardware resources of the issued request. When the assigned UAR covers the resource security levels of all of the required hardware resources of the issued request, the access right checker 334 determines that the issued request has the authority to use the hardware resources 302 and allows the issued request to be executed. When the assigned UAR does not cover the resource security levels of all of the required hardware resources of the issued request, the access right checker 334 determines that the issued request has no authority to use the hardware resources 302 and responds to the issued request with an exception.

A context management module 336 is introduced for aforementioned context store and restore triggered by a change of the protection level.

Figure 4:
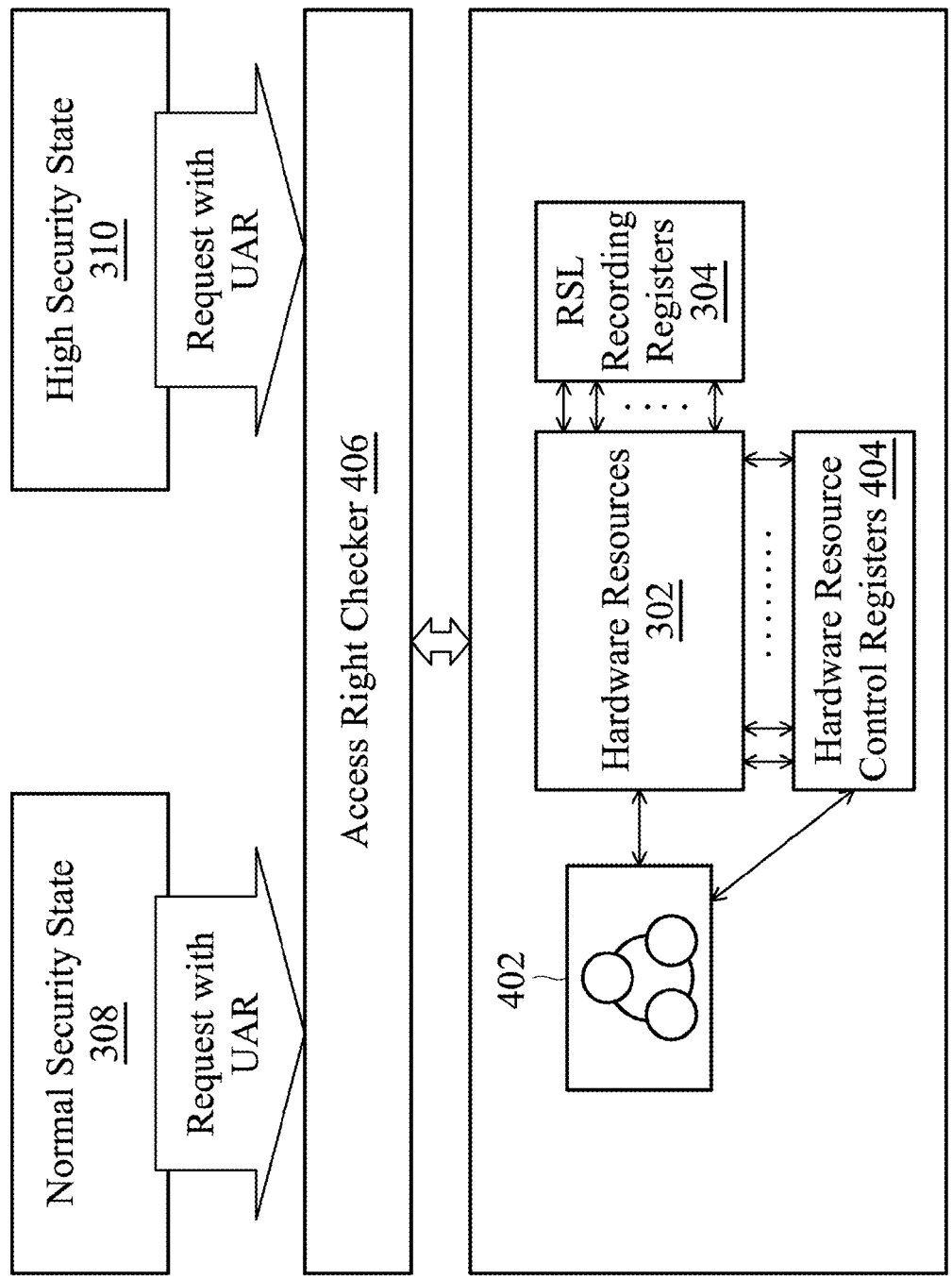
FIG. 4 introduces an embodiment for implementing the architecture of the disclosed computing system.

FIG. 4 introduces another embodiment for implementing the architecture of the disclosed computing system. As shown, in addition to the RSL recording registers 304 of FIG. 3, a finite state machine 402 and hardware resource control registers 404 are equipped with the hardware resources 302. The finite state machine 402 models behavior of the hardware resources 302 and controls the hardware resources 302 via the hardware resources control registers 404. In comparison with the access right checker 334 of FIG. 3, the access right checker 406 further takes a current state of the finite state machine 402 into consideration when determining whether the issued request has the authority to use the hardware resources 302. When the current security state (the normal security state 308 or the high security state 310) of the processor core meets the current state of the finite state machine 402 and the assigned UAR covers the RALs of all of the required hardware resources of the issued request, the access right checker 406 determines that the issued request has the authority to use the hardware resources 302 and allows the issued request to be executed. Otherwise, when the current security state of the processor core does not meet the current state of the finite state machine 402 or the assigned UAR does not cover the RALs of all of the required hardware resources of the issued request, the access rights checker 406 determines that the issued request does not have the authority to use the hardware resources 302 and responds to the issued request with an exception.

Figure 5:
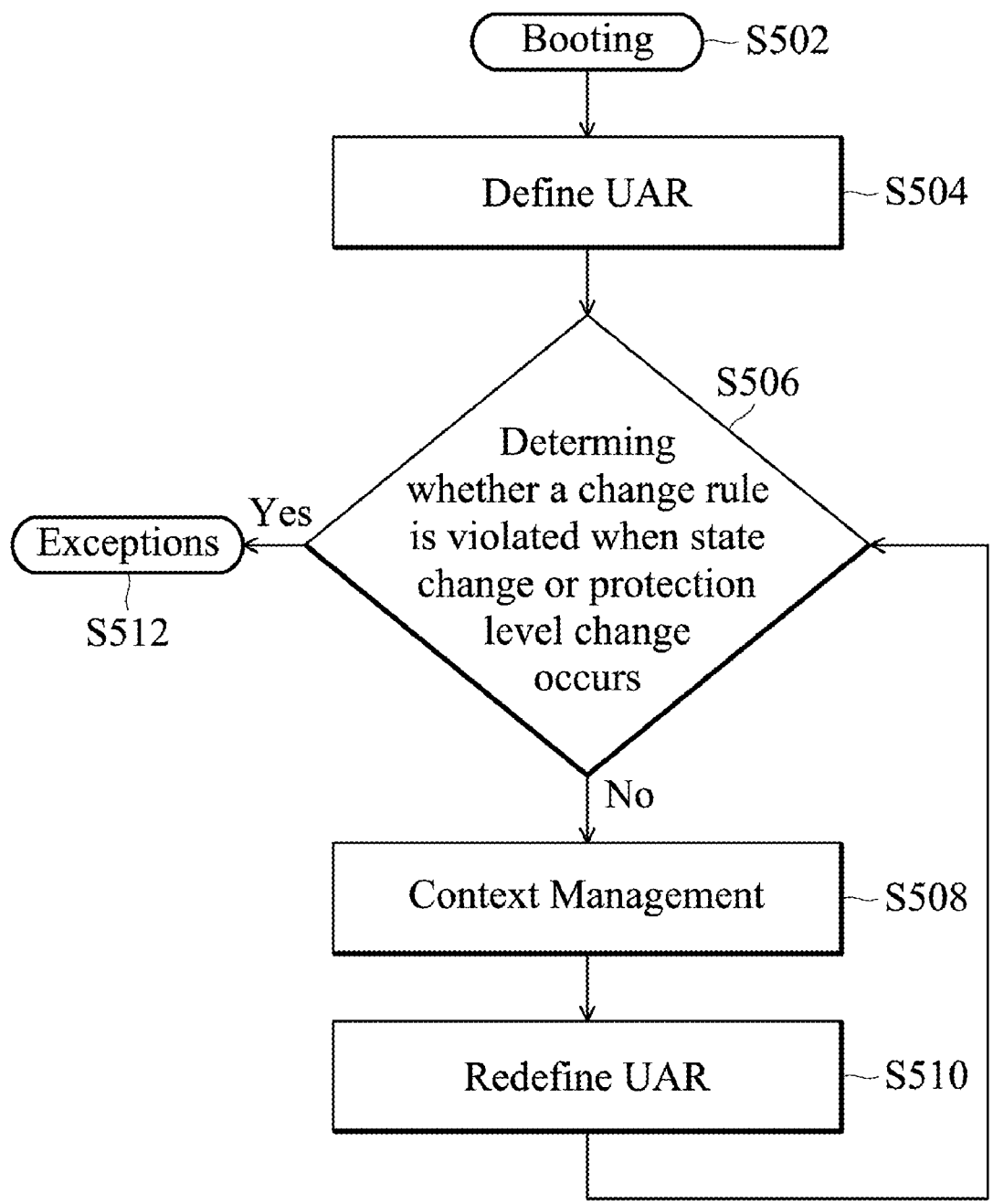
FIG. 5 depicts the flowchart of a UAR update procedure.

FIG. 5 depicts the flowchart of a UAR update procedure. After booting (step S502) of the disclosed computing system, step S504 may be performed to define the UAR according to the current security state of the processor core and the protection level of the computing system. When the security state of the processor core or the protection level of the computing system is changed, the determination step of step S506 is performed to verify whether a change rule (for example, the protection level change rule depicted in FIG. 2) is complied with. If the change rule is not violated, steps S508 and S510 may be performed. The context management of the step of step S508 is designed to store and restore the context of the hardware resources released or isolated in the protection level change. In the step S510, the UAR is redefined in response to the change in the security state of the processor core or change in the protection level of the computing system. The determination step of step S506 is continuously performed for the timely update of the UAR. When the determination step of step S506 determines that the change rule has been violated, the flowchart is directed to exceptions of step S512 to reject the illegal security state or protection level change.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computing system providing normal security services and high security services, comprising:
hardware resources, grouped into a plurality of resource security levels;
a processor core, switching between different security states including a normal security state for providing the normal security services and a high security state for providing the high security services, and assigning a user access right to a request in accordance with the security state of the processor core and a protection level of the computing system, wherein, in comparison with the normal security state, the user access right assigned in the high security state for a particular protection level of the computing system further allows the request to use hardware resources of a higher resource security level, and, for a particular security state of the processor core, the user access right assigned for a lower protection level covers the user access right assigned for a higher protection level; and
an access right checker, determining whether the request has the authority to use the hardware resources in accordance with the assigned user access right and the resource security levels of required hardware resources of the request, wherein:
when determining that the request has the authority to use the hardware resources, the access right checker allows the request to be executed; and
when determining that the request does not have the authority to use the hardware resources, the access rights checker responds the request with an exception.

2. The computing system as claimed in claim 1, further comprising a protection level register for determining a value of the protection level.

3. The computing system as claimed in claim 2, wherein the processor core initializes the protection level register during a security booting procedure of the computing system, and the processor core is in the security state during the security booting procedure.

4. The computing system as claimed in claim 3, further comprising:
a context management module, storing and restoring context of released or isolated hardware resources when the protection level stored in the protection level register is changed, wherein the released hardware resources were initially forbidden from the request before the protection level was switched to a lower security level, and the isolated hardware resources were initially available to the request before the protection level was switched to a higher security level.

5. The computing system as claimed in claim 4, wherein the processor core in the high security state is allowed to switch the protection level to the lower security level.

6. The computing system as claimed in claim 1, wherein the access right checker determines that the request has the authority to use the hardware resources when a scope of the assigned user access right covers the resource security levels of all of the required hardware resources, or, determines that the request does not have the authority to use the hardware resources when the scope of the assigned user access right does not cover the resource security levels of all of the required hardware resources.

7. The computing system as claimed in claim 1, further comprising resource security level registers for determining the resource security level of each of the hardware resources.

8. The computing system as claimed in claim 7, further comprising a finite state machine modeling behavior of the hardware resources and controlling the hardware resources via control registers of the hardware resources.

9. The computing system as claimed in claim 8, wherein the access right checker further takes a current state of the finite state machine into consideration when determining whether the request has the authority to use the hardware resources.

10. The computing system as claimed in claim 9, wherein the access right checker determines that the request has the authority to use the hardware resources when the processor core switching between the normal and high security states meets the current state of the finite state machine and a scope of the assigned user access right covers the resource security levels of all of the required hardware resources, or, determines that the request does not have the authority to use the hardware resources when the processor core does not meet the current state of the finite state machine or the scope of the assigned user access right does not cover the resource levels of all of the required hardware resources.

11. A method of providing normal security and high security services with reduced amount of hardware resources, comprising:
providing hardware resources which are grouped into a plurality of resource security levels;
providing a processor core switched between different security states, the different security states including a normal security state for providing the normal security services and a high security state for providing the high security services;
assigning a user access right to a request in accordance with the security state of the processor core and a protection level of a computing system including the hardware resources and the processor core, wherein, in comparison with the normal security state, the user access right assigned in the high security state for a particular protection level of the computing system further allows the request to use the hardware resources of a higher resource security level, and, for a particular security state of the processor core, the user access right assigned for a lower protection level covers the user access right assigned for a higher protection level;
determining whether the request has the authority to use the hardware resources in accordance with the assigned user access right and the resource security levels of required hardware resources of the request;
executing the request when the request is determined to have the authority to use the hardware resources; and
responding the request with an exception when the request is determined to not have the authority to use the hardware resources.

12. The method as claimed in claim 11, wherein the protection level is initialized by the processor core during a security booting procedure of the computing system, and the processor core is in the security state during the security booting procedure.

13. The method as claimed in claim 12, further storing and restoring context of released or isolated hardware resources when the protection level is changed, wherein the released hardware resources were initially forbidden from the request before the protection level was switched to a lower security level, and the isolated hardware resources were initially available to the request before the protection level was switched to a higher security level.

14. The method as claimed in claim 13, wherein the protection level is allowed to be switched to the lower security level by the processor core when the processor core is in the high security state.

15. The method as claimed in claim 11, wherein the request is determined to have the authority to use the hardware resources when a range of the assigned user access right covers the resource security levels of all of the required hardware resources, or, is determined to not have the authority to use the hardware resources when the scope of the assigned user access right does not cover the resource security levels of all of the required hardware resources.

16. The method as claimed in claim 15, wherein the step of determining whether the request has the authority to use the hardware resources further takes a current state of the finite state machine into consideration.

17. The method as claimed in claim 16, wherein the request is determined to have the authority to use the hardware resources when the processor core switching between the normal and high security states meets the current state of the finite state machine and a scope of the assigned user access right covers the resource security levels of all of the required hardware resources, or, is determined to not have the authority to use the hardware resources when the processor core does not meet the current state of the finite state machine or the scope of the assigned user access right does not cover the resource levels of all of the required hardware resources.

* * * * *